United States Patent [19]

Miyazaki et al.

[11] Patent Number: 5,599,633
[45] Date of Patent: Feb. 4, 1997

[54] WIRE ELECTRODE FOR ELECTRO-DISCHARGE MACHINING

[75] Inventors: Kenji Miyazaki; Shigeo Ezaki; Naoyuki Ohkubo, all of Osaka, Japan

[73] Assignee: Sumitomo Electric Industries, Ltd., Osaka, Japan

[21] Appl. No.: 390,417

[22] Filed: Feb. 17, 1995

Related U.S. Application Data

[63] Continuation of Ser. No. 58,418, May 7, 1993, abandoned.

[30] Foreign Application Priority Data

Jun. 11, 1992 [JP] Japan .................................. 4-151988

[51] Int. Cl.$^6$ ....................................... B23H 1/06
[52] U.S. Cl. ........................ 428/675; 428/607; 219/69.12
[58] Field of Search .................................. 428/607, 675, 428/658; 219/69.12

[56] References Cited

U.S. PATENT DOCUMENTS

| | | | |
|---|---|---|---|
| 2,312,506 | 3/1943 | Tomlinson et al. | 428/675 |
| 4,287,404 | 9/1981 | Convers et al. | 219/69 W |
| 4,686,153 | 8/1987 | Tominaga et al. | 428/675 |
| 4,968,867 | 11/1990 | Banzai et al. | 219/69.12 |
| 5,118,572 | 6/1992 | DeRobert et al. | 428/607 |

FOREIGN PATENT DOCUMENTS

| | | |
|---|---|---|
| 0185492 | 6/1986 | European Pat. Off. . |
| 0232524 | 8/1987 | European Pat. Off. . |
| 0381595 | 8/1990 | European Pat. Off. . |
| 0400561 | 12/1990 | European Pat. Off. . |
| 55-156614 | 12/1980 | Japan . |
| 57-5648 | 2/1982 | Japan . |
| 59-129629 | 7/1984 | Japan . |
| 59-127921 | 7/1984 | Japan . |
| 61-136733 | 6/1986 | Japan . |
| 63-207523 | 8/1988 | Japan . |
| 3-236431 | 10/1991 | Japan . |

OTHER PUBLICATIONS

Derwent & JPO abstracts for JP 59–127,921.
Derwent & JPO abstracts for JP 59–129,629.

*Primary Examiner*—Ngoc-Yen Nguyen
*Attorney, Agent, or Firm*—W. G. Fasse; W. F. Fasse

[57] ABSTRACT

Disclosed herein is a wire electrode for wire cutting electro-discharge machining which can improve the processing speed as well as productivity of the wire electrode. A core (2) is made of a copper alloy containing Ag. A coating layer (1) formed on the outer periphery of the core (2) is made of a copper alloy containing Zn and Al.

11 Claims, 1 Drawing Sheet

WIRE ELECTRODE FOR ELECTRO-DISCHARGE MACHINING

This application is a file wrapper continuation of application Ser. No. 08/058,418, filed on May 7, 1993, now abandoned.

BACKGROUND OF THE INVENTION

1. Field of the Invention

The present invention relates to a wire electrode for wire cutting electro-discharge machining, and more particularly, it relates to a wire electrode for wire cutting electro-discharge machining which comprises a core and a coating layer provided on the outer periphery of the core.

2. Description of the Background Art

Wire cutting electro-discharge machining is a method of generating an electric spark discharge across a workpiece and a wire-type working electrode (hereinafter referred to as "wire electrode") and relatively moving the wire electrode and the workpiece for cutting the workpiece into a desired shape. Such electro-discharge machining has been carried out in general.

In general, a long wire electrode 0.05 to 0.25 mm in diameter is passed through a guide so that a new wire electrode is successively supplied to a worked portion or electro-discharge location, thereby carrying out electro-discharge machining.

In such electro-discharge machining, the quality of the wire electrode that is employed directly, remarkably influences the processing speed, processing accuracy, surface smoothness of a worked surface and the like. Thus, the development of a preferable material suitable for such electro-discharge machining is greatly desired in the field.

An example of a conventional wire electrode is made of a material prepared by adding Al, Si and the like to a Cu-Zn alloy. Zn, Al, Si and the like are added in order to improve the processing speed. If the total amount of Zn (wt. %)+(6×Al)(wt. %)+(9×Si)(wt. %) exceeds 38 percent by weight, however, it is difficult to work the material into a wire electrode.

When a current applied to the wire electrode is increased, the processing speed is improved. If the total amount of Zn (wt. %)+(6×Al)(wt. %)+(9×Si)(wt. %) exceeds 38 percent by weight, however, the heat resistance of the material is so deteriorated that the wire electrode disadvantageously becomes fused when a large current is applied there-to. Thus, the current cannot be increased and hence it is impossible to improve the processing speed.

Japanese Patent Publication No. 57-5648 (1982) and Japanese Patent Laying-Open Nos. 59-129629 (1984) and 59127921 (1984) disclose other examples of conventional wire electrodes. Each of the wire electrodes disclosed in these references has a two-layer structure of a core and a coating layer which is formed on the outer periphery of the core.

The core is made of a copper alloy, while the coating layer is made of a zinc alloy. The coating layer is mainly composed of zinc since the processing speed is increased in proportion to the content of zinc. The zinc contained in the coating layer is evaporated when electricity is applied to the wire electrode, to allow smooth discharge across the wire electrode and a workpiece. Such smooth discharge leads to improvement of the processing speed.

When the coating layer is mainly composed of a zinc alloy in order to improve the processing speed, however, this coating layer is made fragile. When the wire electrode is passed through a guide, therefore, the coating layer may be scraped by friction between the guide and the coating layer.

SUMMARY OF THE INVENTION

An object of the present invention is to provide a wire electrode for wire cutting electro-discharge machining, having a coating layer that is hard to scrape, and having a high processing speed.

In an aspect of the present invention, a wire electrode for wire cutting electro-discharge machining comprises a core containing a first copper alloy, and a coating layer on the outer periphery of the core, the coating layer containing a second copper alloy which contains 38 to 49 percent by weight of Zn with the remainder being Cu and unavoidable impurities.

In another aspect of the present invention, a wire electrode for wire cutting electro-discharge machining comprises a core containing a first copper alloy, and a coating layer on the outer periphery of the core, the coating layer containing a third copper alloy which contains Zn and Al in a range of at least 38 percent by weight of Zn and not more than 49 percent by weight of Zn+(6×Al) with the remainder being Cu and unavoidable impurities.

According to the present invention, a copper alloy is employed as a material for the coating layer, whereby the coating layer is harder to scrape than a coating layer of a zinc alloy.

The coating layer provided in the inventive wire electrode for wire cutting electro-discharge machining is made of a second copper alloy containing 38 to 49 percent by weight of Zn with the remainder being Cu and unavoidable impurities or a third copper alloy containing Zn and Al in a range of at least 38 percent by weight of Zn and not more than 49 percent by weight of Zn+(6×Al) with the remainder being Cu and unavoidable impurities, for the following reasons: While the processing speed can be improved as the content of Zn is increased, the Zn content is restricted as described above in consideration of production of the wire electrode for wire cutting electro-discharge machining.

If the content of Zn is less than 38 percent by weight, extrusion becomes impossible due to excessive plastic deformation resistance at a high temperature, and hence the material cannot be worked into a wire electrode for wire cutting electro-discharge machining. When the content of Zn or Zn+(6×Al) exceeds 49 percent by weight, on the other hand, the material becomes so fragile that it is difficult to work the same into a wire electrode for wire cutting electro-discharge machining. A metal layer of a Cu-Zn alloy exhibits an α phase when the content of Zn is not more than 40 percent by weight, while the same exhibits a β phase when the Zn content exceeds 40 percent by weight. The β phase is fragile as compared with the α phase. The third copper alloy contains Al, which is adapted to improve heat resistance of the third alloy. The range in terms of 6×Al is set by reason that Al has a Zn equivalent of 6.

In order to obtain a wire electrode for wire cutting electro-discharge machining according to the present invention with excellent production characteristics, a Cu-Zn or Cu-Zn-Al alloy is extruded through a conformer onto the outer periphery of a core in a stage having a larger wire diameter than the final one, and is then worked into a desired wire diameter. This method is disclosed in Japanese Patent Laying-Open No. 55-156614 (1980), for example.

As hereinabove described, the processing speed is improved as the content of Zn or Zn+Al is increased. In consideration of improvement in processing speed, therefore, the content of Zn or Zn+Al is preferably maximized.

On the other hand, tensile strength at high temperature is reduced as the amount of Zn contained in the copper alloy is increased. Each of the second and third copper alloys, containing at least 38 percent by weight of Zn, is insufficient in tensile strength at high temperature. Therefore, the first copper alloy for forming the core preferably contains not more than 20 percent by weight of Zn or not more than 7 percent by weight of at least either Sn or Ag. When the core is made of such a material, it is possible to increase conductivity as well as to improve tensile strength at high temperature. If the composition of the core material is out of the above range, conductivity is extremely reduced and tensile strength under a high temperature is lowered while plastic deformation is made difficult. Hence, it is difficult to work the material into a wire electrode for wire cutting electro-discharge machining. The first copper alloy may alternatively contain not more than 20 percent by weight of Zn and not more than 7 percent by weight of at least either Sn or Ag so that the total content of these elements is not more than 27 percent by weight.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
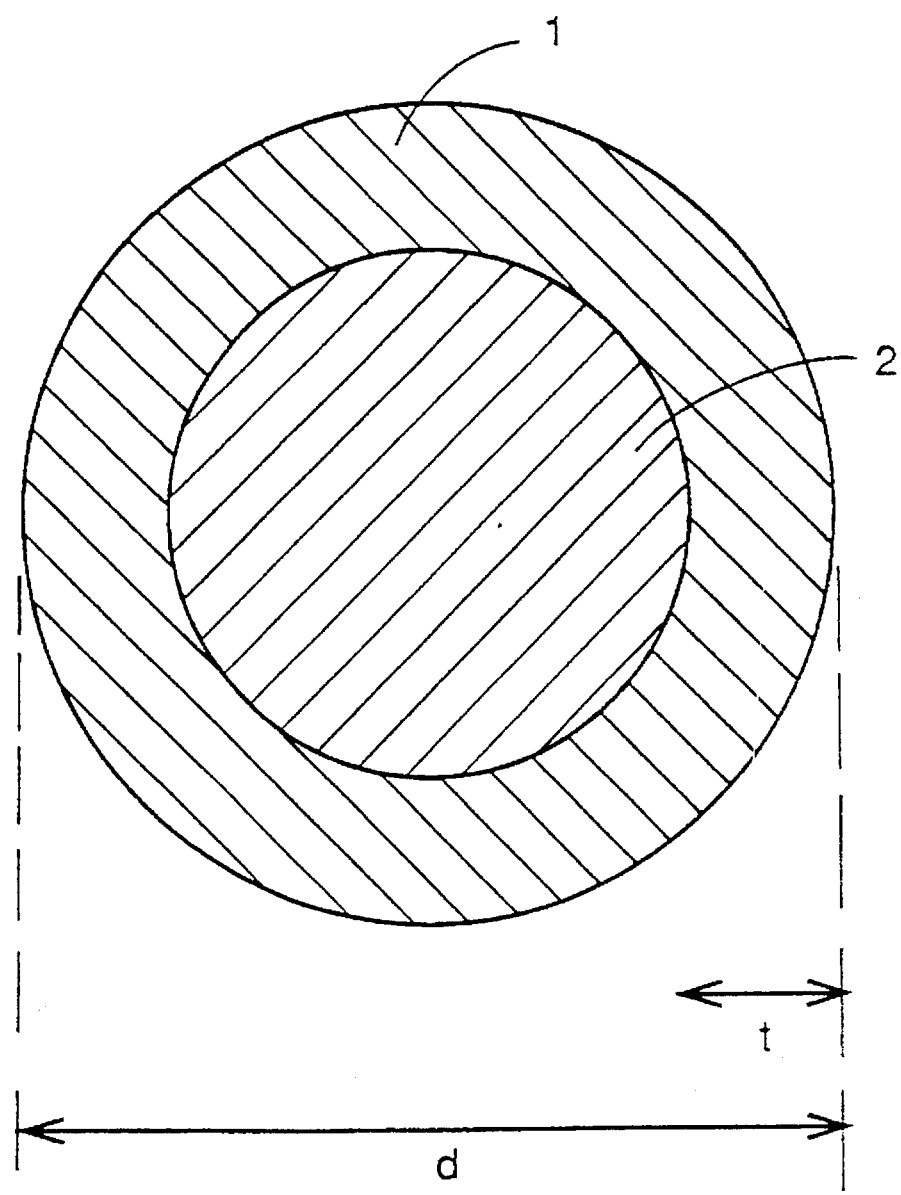
FIG. 1 is a sectional view showing an embodiment of the present invention.

FIG. 1 is a sectional view showing a wire electrode for wire cutting electro-discharge machining according to an embodiment of the present invention. A coating layer 1 is formed on the outer periphery of a core 2. The thickness t of the coating layer 1 is preferably 10 to 20% of the diameter d of the wire electrode for wire cutting electro-discharge machining. If the former exceeds 20% of the latter, the wire electrode for wire cutting electro-discharge machining is reduced in tensile strength at high temperature, since the coating layer 1 has lower tensile strength at high temperature as compared with the core 2. If the former is less than 10% of the latter, on the other hand, the processing speed may not be so high.

Samples of wire electrodes for wire cutting electro-discharge machining were prepared in compositions shown in Table 1.

TABLE 1

|  |  | Coating Layer | Core |
|---|---|---|---|
| Inventive Sample | 1 | Cu 39% Zn | Cu-2.0% Sn |
|  | 2 | Cu-40% Zn-0.5% Al | Cu-0.3% Sn |
|  | 3 | Cu-43% Zn | Cu-13% Zn |
|  | 4 | Cu-41% Zn-0.7% Al | Cu-0.6% Ag |

TABLE 1-continued

|  |  | Coating Layer | Core |
|---|---|---|---|
|  | 5 | Cu-43% Zn-1.0% Al | Cu-4.0% Zn-0.3% Sn |
| Comparative Sample | 6 | Cu-30% Zn | Cu-13% Zn |
|  | 7 | Cu-45% Zn-1.0% Al | Cu-0.3% Sn |
|  | 8 | Cu-35% Zn | Cu-0.3% Sn |
| Conventional Sample | 9 | Cu-35% Zn |  |
|  | 10 | Cu-35% Zn-0.05% Al |  |

The inventive samples 1 to 5 were continuously extruded by a Conform (continuous forming) machine so that the wire electrodes for wire cutting electro-discharge machining had outer diameters of 8 mm with respect to cores of 5.3 mm outer diameter. The extrusion temperature was 450° C. Drawing and intermediate softening were repeated on the as-extruded rods, to prepare wire electrodes for wire cutting electro-discharge machining having outer diameters of 0.3 mm.

Regarding the comparative sample 6, it was impossible to prepare a wire electrode for wire cutting electro-discharge machining since this sample did not allow continuous extrusion. As to the comparative sample 7, it was impossible to prepare a wire electrode for wire cutting electro-discharge machining due to the wire breaking during drawing, although this sample allowed continuous extrusion. As to the comparative sample 8, a wire electrode for wire cutting electro-discharge machining was prepared by pipe engagement, since this sample did not allow continuous extrusion. On the other hand, the conventional samples 9 and 10 had single layer structures.

These wire electrodes for wire cutting electro-discharge machining were subjected to measurement of conductivity values and processing speeds. Table 2 shows the results.

TABLE 2

|  |  | Conductivity (% IACS) | Processing Speed |
|---|---|---|---|
| Inventive Sample | 1 | 30 | 130 |
|  | 2 | 40 | 140 |
|  | 3 | 33 | 135 |
|  | 4 | 43 | 165 |
|  | 5 | 40 | 160 |
| Comparative Sample | 6 | unmeasurable | unmeasurable |
|  | 7 | unmeasurable | unmeasurable |
|  | 8 | unmeasurable | unmeasurable |
| Conventional Sample | 9 | 18 | 100 |
|  | 10 | 18.5 | 105 |

Referring to Table 2, the processing speeds are expressed relative to the conventional sample 9 exhibiting a value of 100. As understood from Table 2, the inventive samples were superior in conductivity and processing speed to the conventional samples. The comparative sample 8, which was close to the inventive samples in both conductivity and processing speed, was inferior in production characteristics to the inventive samples, which were prepared through a Conform machine, since this comparative sample was prepared by pipe engagement.

According to the inventive wire electrode for wire cutting electro-discharge machining, as hereinabove described, it is possible to improve the processing speed, while it is also possible to improve production characteristics of the wire electrode for wire cutting electro-discharge machining.

Although the present invention has been described an illustrated in detail, it is clearly understood that the same is by way of illustration and example only and is not to be taken by way of limitation, the spirit and scope of the present invention being limited only by the terms of the appended claims.

What is claimed is:

1. A wire electrode for electro-discharge machining, comprising a core and a coating layer on the outer periphery of said core, wherein said core contains a core copper alloy containing at least about 0.16 percent by weight and not more than 7 percent by weight of Ag, and said coating layer contains a coating copper alloy containing Zn and Al in a range of at least 38 percent by weight of Zn and not more than 49 percent by weight of Zn+(6×Al) with the remainder of said coating copper alloy being Cu and unavoidable impurities.

2. The wire electrode in accordance with claim 1, wherein said core copper alloy further contains a positive amount of Zn more than an unavoidable impurity level and not more than 20 percent by weight.

3. The wire electrode in accordance with claim 1, wherein said core copper alloy further contains a positive amount of Zn more than an unavoidable impurity level and not more than 20 percent by weight, and further contains Sn in an amount so that said Sn and said Ag together are not more than 7 percent by weight of said core copper alloy.

4. The wire electrode in accordance with claim 1, wherein the thickness of said coating layer is 10 to 20% of a sectional diameter of said wire electrode.

5. The wire electrode in accordance with claim 1, wherein said coating copper alloy contains more than 40 percent by weight of Zn.

6. The wire electrode in accordance with claim 1, wherein the particular composition of said coating copper alloy is selected for improving the workability of said wire electrode during production of said wire electrode.

7. The wire electrode in accordance with claim 2, wherein said positive amount of Zn is at least 13 percent by weight and not more than 20 percent by weight.

8. The wire electrode in accordance with claim 2, wherein said positive amount of Zn in said core is at least 4 percent by weight and not more than 20 percent by weight.

9. The wire electrode in accordance with claim 2, wherein said positive amount of Zn in said core is at least 4 percent by weight and less than 10 percent by weight.

10. The wire electrode in accordance with claim 3, wherein said positive amount of Zn in said core is at least 4 percent by weight and not more than 20 percent by weight.

11. The wire electrode in accordance with claim 3, wherein said positive amount of Zn in said core is at least 4 percent by weight and less than 10 percent by weight.

* * * * *